United States Patent
Middlecamp et al.

(10) Patent No.: US 8,332,684 B2
(45) Date of Patent: Dec. 11, 2012

(54) TIMER BOUNDED ARBITRATION PROTOCOL FOR RESOURCE CONTROL

(76) Inventors: William J. Middlecamp, Apple Valley, MN (US); Tim LaBerge, St. Paul, MN (US); John Reinart, Roseville, MN (US)

( * ) Notice: Subject to any disclaimer, the term of this patent is extended or adjusted under 35 U.S.C. 154(b) by 363 days.

(21) Appl. No.: 12/821,251

(22) Filed: Jun. 23, 2010

(65) Prior Publication Data

US 2011/0107139 A1 May 5, 2011

Related U.S. Application Data

(60) Provisional application No. 61/259,271, filed on Nov. 9, 2009.

(51) Int. Cl.
*G06F 11/00* (2006.01)

(52) U.S. Cl. ................. 714/4.11; 714/5.11

(58) Field of Classification Search .......... 714/4.11
See application file for complete search history.

(56) References Cited

U.S. PATENT DOCUMENTS

| | | | | |
|---|---|---|---|---|
| 5,392,434 A | * | 2/1995 | Bryant et al. | 710/244 |
| 5,649,206 A | * | 7/1997 | Allen | 710/241 |
| 5,805,905 A | * | 9/1998 | Biswas et al. | 710/244 |
| 6,263,452 B1 | * | 7/2001 | Jewett et al. | 714/5.11 |
| 6,625,750 B1 | * | 9/2003 | Duso et al. | 714/11 |
| 7,711,820 B2 | * | 5/2010 | Sharma et al. | 709/226 |
| 7,747,806 B2 | * | 6/2010 | Fuchikami | 710/242 |
| 2005/0009467 A1 | * | 1/2005 | Nuber | 455/12.1 |
| 2006/0117212 A1 | * | 6/2006 | Meyer et al. | 714/4 |
| 2006/0168192 A1 | * | 7/2006 | Sharma et al. | 709/224 |
| 2007/0088842 A1 | * | 4/2007 | Mandal et al. | 709/230 |
| 2009/0132791 A1 | * | 5/2009 | Fields et al. | 712/219 |

* cited by examiner

*Primary Examiner* — Kamini Patel

(57) ABSTRACT

Example apparatus, methods, and computers prevent a split brain scenario in a pair of high availability servers by maintaining single writer access to a resource by controlling the resource according to a timer bounded arbitration protocol that controls self-termination of a writer process. One example method includes monitoring control of an arbitration (ARB) block by an active file system manager (FSM) and selectively causing a selection of a standby metadata controller (MDC) when control of the ARB block does not satisfy the timer bounded ARB protocol. The example method also includes selectively forcing a hardware reset of an apparatus running the active FSM and selectively establishing an FSM on a selected redundant MDC as a replacement FSM.

16 Claims, 8 Drawing Sheets

TIMER BOUNDED ARBITRATION PROTOCOL FOR RESOURCE CONTROL

CROSS-REFERENCE TO RELATED APPLICATIONS

This is application claims the benefit of U.S. Provisional Patent Application 61/259,271 filed Nov. 9, 2009, which is incorporated by reference herein in its entirety.

BACKGROUND

High availability (HA) systems facilitate having a standby server take over in the event of undesired failures on a primary server. Goals for an HA system are to provide safety and uninterrupted operation. If a primary server fails, failover should occur automatically and operations should resume on a redundant server. However, at any point in time, only one of the two servers should have write access to certain items. For example, at any point in time there should only be one server with write access to file system metadata. In another example, at any point in time there should only be one server with write access to certain databases. When two servers both have write access, this may be referred to as a split brain scenario (SBS).

Conventional systems may have employed protocols and techniques for preventing multiple writer access leading to an SBS. However, these conventional systems may have had no bounds on the timing for a protocol. Additionally, these conventional systems may have required the redundant server to terminate the primary server. Therefore these conventional systems may have required additional hardware to facilitate the required communications and control between servers. However, it may have been possible to subvert control of a power device and therefore avoid a desired hardware reset simply by re-arranging power cords. Conventionally, these systems may have been "trigger happy", which led to unnecessary hardware resets when an ambiguous or non-deterministic state was encountered. One unintentional occurrence that could lead to an undesired hardware reset involved a communications network breakdown or slowdown. When synchronizing communications were lost, a hardware reset may have been forced, even though all parts of the system except the communications network were healthy and single writer access was still in place.

BRIEF DESCRIPTION OF THE DRAWINGS

The accompanying drawings, which are incorporated in and constitute a part of the specification, illustrate various example methods, apparatuses, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
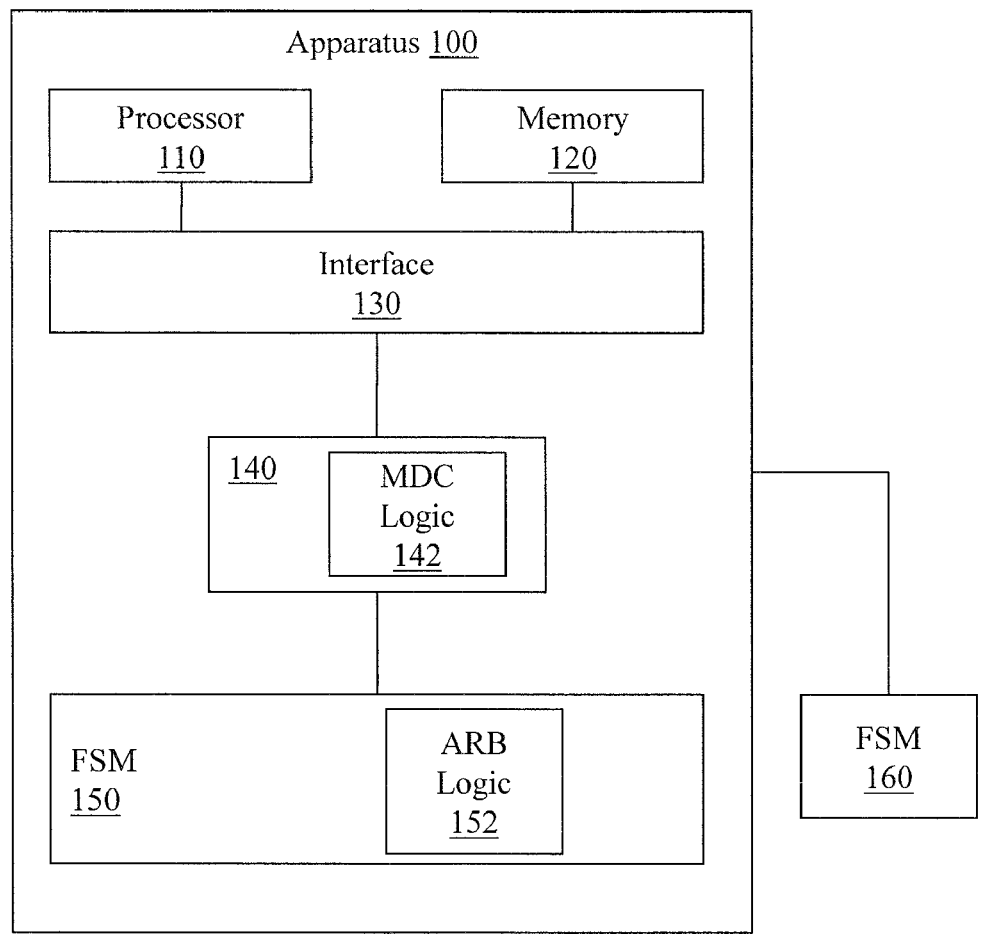
FIG. 1 illustrates an apparatus configured to participate in a timer bounded arbitration protocol for resource control that facilitates maintaining single writer access between a pair of high availability servers.

Example apparatus and methods prevent a split brain scenario (SBS) where both servers in a high availability (HA) pair could have write access to resources (e.g., file system metadata, databases) for which there should only be single writer access. In one example, a failing server is reset at the hardware level causing the failing server to relinquish write access. If the failing server is reset, the standby server can acquire write access without risking SBS.

Example apparatus and methods rely on a timer bounded arbitration (ARB) protocol that uses an ARB block for both co-ordination and communication. ARB block updates by a controlling (e.g., primary) server for a file system provide the most basic level of communication between HA servers. If the controlling server is unable to update the ARB, it will relinquish control of the ARB block within a prescribed time limit. If the controlling server does not relinquish control within the prescribed time limit, a hardware reset will be performed on the controlling server. Neither the voluntary relinquishment nor the hardware reset requires a communication from the standby server or an action by a failing file system manager (FSM).

In one example, control of and access to file system metadata is regulated through an ARB dedicated disk block. The timer bounded ARB protocol for resource control regulates acquiring control of the ARB block, maintaining control of the ARB block, and usurping control of the ARB block. A process that has control of the ARB block will periodically write the ARB block to "brand" the ARB block and thereby signal ownership and active control. When the process that has control of the ARB block successfully brands the ARB block, the process resets a "dead man" timer. If the ARB block is not written before the dead man timer expires, then the timer bounded ARB protocol for resource control has been violated and a hardware reset may be forced. When the hardware reset occurs, a standby server and/or process may be activated. To prevent the possibility of the standby acquiring the ARB block before the primary has been reset, the standby will wait as long as the dead man timer period plus a safety timer period before taking control. The wait will be measured from the time the standby last noticed a unique brand of the ARB block. If the standby determines that the primary has resumed branding the ARB during the waiting period, then the standby may stand down and allow the primary to resume control. If the standby determines that the ARB is being branded during the waiting period, then the standby may determine whether it is the most appropriate server to take control of the ARB. If so, then the standby may acquire control of the ARB, even though some other server or process is branding the ARB.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

FIG. 1 illustrates an apparatus 100. Apparatus 100 facilitates maintaining single writer access between a pair of high availability servers. Apparatus 100 includes a processor 110, a memory 120, and an interface 130. Interface 130 connects the processor 110, the memory 120, and a set 140 of logics. The set 140 of logics may include a metadata controller logic 142.

The metadata controller logic 142 may be configured to selectively terminate an active file system manager (FSM) 150 associated with the apparatus 100. The FSM 150 may also be configured to selectively activate a standby FSM 160 available on a different apparatus. The FSM 160 may be activated upon determining that FSM 150 has not maintained control according to a timer bounded ARB protocol. The timer bounded ARB protocol relies on an ARB block acting as a resource shared between the FSM 150 and the FSM 160.

The ARB logic 152 may be configured to maintain single writer access to file system metadata by the FSM 150 and the redundant FSM 160. Recall that an SBS can occur if both the FSM 150 and the redundant FSM 160 have write access to a protected resource (e.g., file system metadata, database). The ARB logic 152 may synchronize control of the ARB block by using the ARB block. Thus the ARB block can both be used by the timer bounded arbitration protocol and can control the timer bounded arbitration protocol.

In one example, the metadata controller logic 142 is configured to control a kernel thread to terminate the active FSM 150. One skilled in the art appreciates that the term "kernel" is used in its computer science and operating system term of art faun. Similarly, one skilled in the art appreciates that the term "thread" is used in its computer science and operating system term of art form. In one example, portions of the processing performed by the metadata controller logic 142 may be performed by a kernel thread.

Apparatus 100 is configured to prevent an SBS by controlling the FSM 150 and the FSM 160 so that only one of them will have write access to a protected resource (e.g., file system metadata, database) at any given point in time. Therefore, in one example, the metadata controller logic 142 is configured to terminate an active FSM 150 before the FSM 160 takes control of the ARB block.

Apparatus 100 may run an operating system. The operating system may employ special device files in its file system operations. One skilled in the art of operating systems and file systems appreciates how operating systems interact with and employ special device files. When apparatus 100 is running an operating system that employs special device files (e.g., UNIX, LINUX), the metadata controller logic 142 may be configured to force a hardware reset of the apparatus in response to the closing of an operating system special file. For example, if the FSM 150 is interacting with an active timer, and if the active timer is associated with a special device file, then when the special device file is closed in response to the termination of an active FSM, the metadata controller logic 142 may force a hardware reset. This may be referred to as a "reset on close".

While apparatus 100 may perform a reset on close, metadata controller logic 142 can also be configured to selectively not force a reset on close. In one embodiment, the metadata controller logic 142 may determine that an operating system unmount of a file system associated with databases has completed successfully leaving no active database writers in the MDC. In this case there is no risk of an SBS and thus there is no need to force a hardware reset to prevent an SBS.

Example apparatus and methods can therefore control the action of an MDC to do a hardware reset equivalent to power cycling a server. The hardware reset is forced when an FSM is unable to maintain its brand of an ARB block for a prescribed length of time. The hardware reset can also be forced when particular processes terminate. In both cases, the processes initiate their own monitoring with an operating system ioctl (input output control) call. A kernel thread may be responsible for triggering the reset. The kernel thread can use a dead man-style timer and close-on-exit processing to force the hardware reset.

Figure 2:
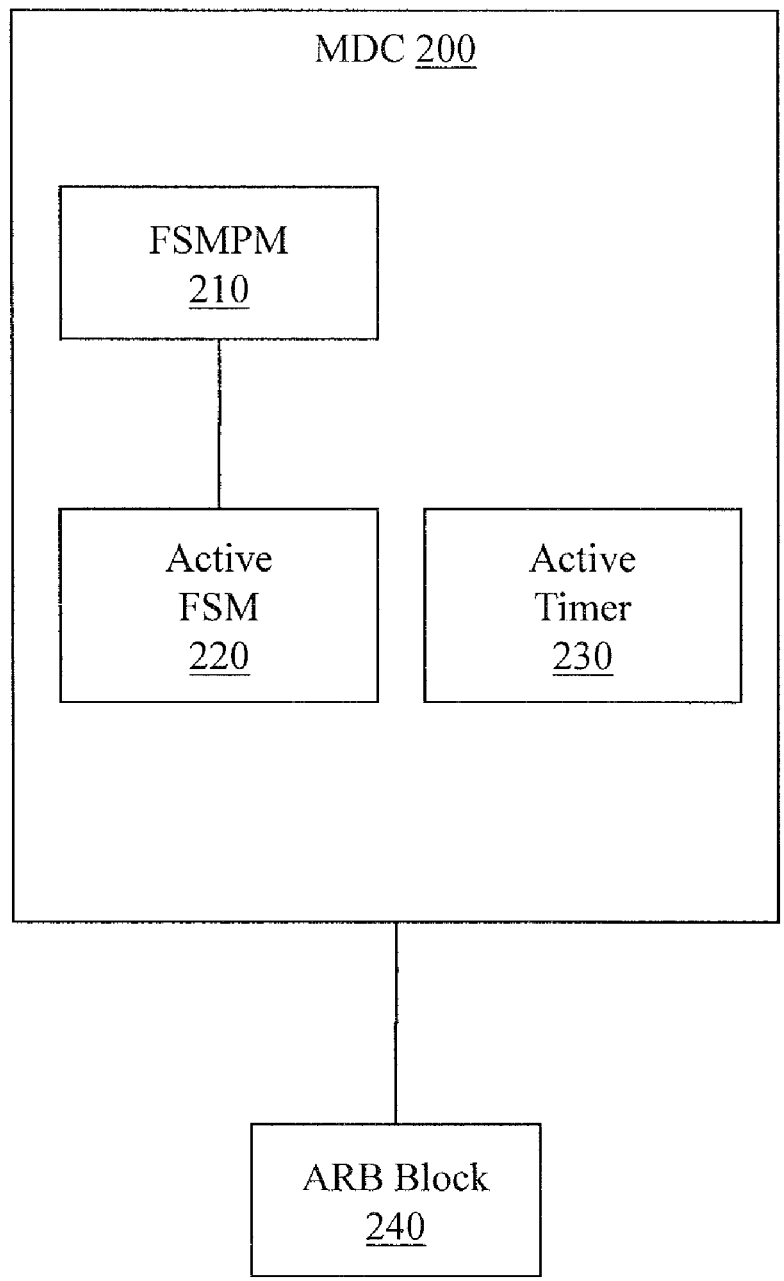
FIG. 2 illustrates a metadata controller (MDC) used in a system for maintaining single writer access between a pair of high availability servers.

FIG. 2 illustrates a metadata controller (MDC) 200. MDC 200 contains an active FSM 220 that has control of an ARB block 240. MDC 200 is used in a system for maintaining single writer access between a pair of high availability servers. MDC 200 may correspond to an instance of MDC 150 (FIG. 1).

MDC 200 includes a file system portmapper (FSMPM) 210, an active file system manager (FSM) 220, and an active timer 230. The FSMPM 210 is connected to the active FSM 220 by a socket. One way that active FSMPM 210 can determine that active FSM 220 is not operating properly is by a close of the socket. Recall that the active FSM 220 is configured to maintain ownership of the ARB block 240 by periodically writing the ARB block 240 according to the timer bounded ARB protocol and to reset the active timer 230 upon successfully writing the ARB block 240. The active FSMPM 210 can also be configured to selectively force an election of an MDC to replace the active MDC 200 as the single writer upon a determination that the active MDC 200 has terminated. In most cases, the termination of an FSM is the event that leads to an election to select a replacement FSM for activation. The termination may have occurred because the timer expired and reset the MDC, or it could be because the FSM panic'd, exited voluntarily, or was directed to exit by its FSMPM (an administrative action). In a few cases, loss of communication can make it appear that the FSM has terminated.

Figure 3:
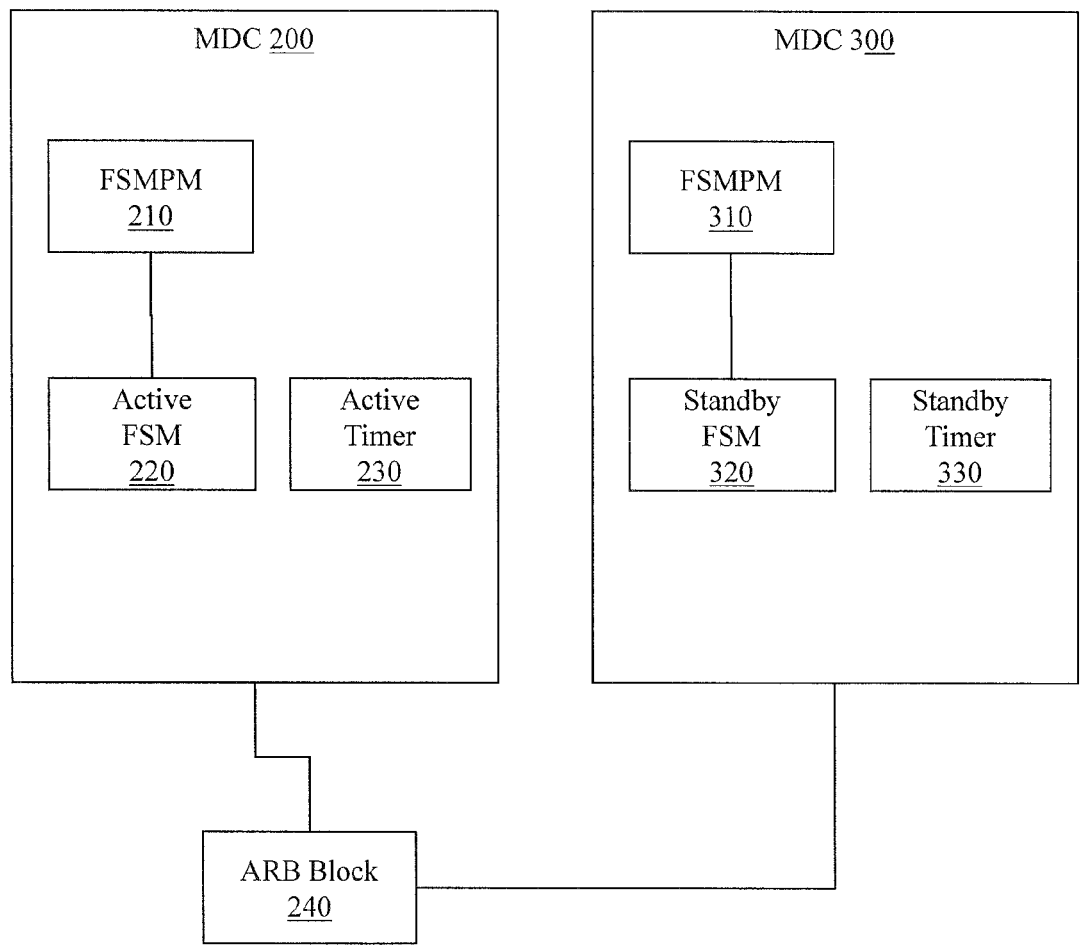
FIG. 3 illustrates a pair of MDCs used in a system for maintaining single writer access between a pair of high availability servers.

FIG. 3 illustrates a pair of MDCs used in a system for maintaining single writer access between a pair of high availability servers. The pair of MDCs includes MDC 200 and MDC 300. The active MDC 200 is described in FIG. 2. The MDC 300 includes an FSMPM 310, a standby FSM 320, and a standby timer 330. The FSMPM 310 is configured to activate the standby FSM 320 to take control of the ARB block 240 after being elected to replace the active FSM 220. The standby FSM 320 is configured to acquire ownership of the ARB block 240, to maintain ownership of the ARB block 240 by periodically writing the ARB block 240 according to the timer bounded ARB protocol, and to restart the standby timer 330 upon successfully writing the ARB block 240. In one embodiment, the MDC 200 and the MDC 300 reside on separate pieces of computer hardware and communicate over a computer network.

FIG. 3 illustrates the active timer 230 and the standby timer 330 as being internal to the MDC 200 and the MDC 300 respectively. One skilled in the art will appreciate that the timers 230 and 330 may be part of an MDC or may be external to but used by an MDC. For example, a timer may be external to a process and/or hardware implementing MDC 200 or MDC 300. Therefore, in different examples, the active timer 230 can be, but is not limited to being, a kernel timer, an operating system timer, and a timer associated with computer hardware (e.g., peripheral component interconnect express (PCIE) card) operatively connected to an interface visible to active MDC 200. In one embodiment, there is one timer per active FSM 220. Similarly, the standby timer 330 can be, but is not limited to being, a kernel timer, an operating system timer, and a timer associated with computer hardware (e.g., PCIE card) operatively connected to an interface visible to MDC 300. There is one timer per standby FSM 320.

The MDC 200 and the MDC 300 participate in the timer bounded arbitration protocol. In one example, the timer bounded arbitration protocol includes controlling the active FSM 220 to write the ARB block 240 once per FSM write period. The periodic writing indicates continued ownership of the ARB block 240. When a write to the ARB block 240 is successful, the active FSM 220 will restart the active timer 230 to a reset threshold period. Recall that it is the expiration of the active timer 230 that resets the MDC.

Since the MDC 200 is being terminated, the MDC 300 may be called upon to take over the ARB block 240 and to hold single writer access that had previously been held by the MDC 200. In this example, the timer bounded arbitration protocol also includes controlling the FSMPM 310 to activate the standby FSM 320 upon determining that the redundant MDC 300 has been selected to take control of the ARB block 240. The protocol also includes the standby FSM 320 taking control of the ARB block 240 by writing the ARB block 240 after being activated by the FSMPM 310.

One skilled in the art will appreciate that a failover system for a pair of high availability servers can be arranged in different environments and may experience different operating conditions, different communication conditions, and other different factors. Therefore the timer bounded arbitration protocol may have different time delays. In one embodiment, the FSM write period is 0.5 seconds, the reset threshold period is 5 seconds, and the delay time period is the reset threshold period plus twice the FSM write period.

Figure 4:
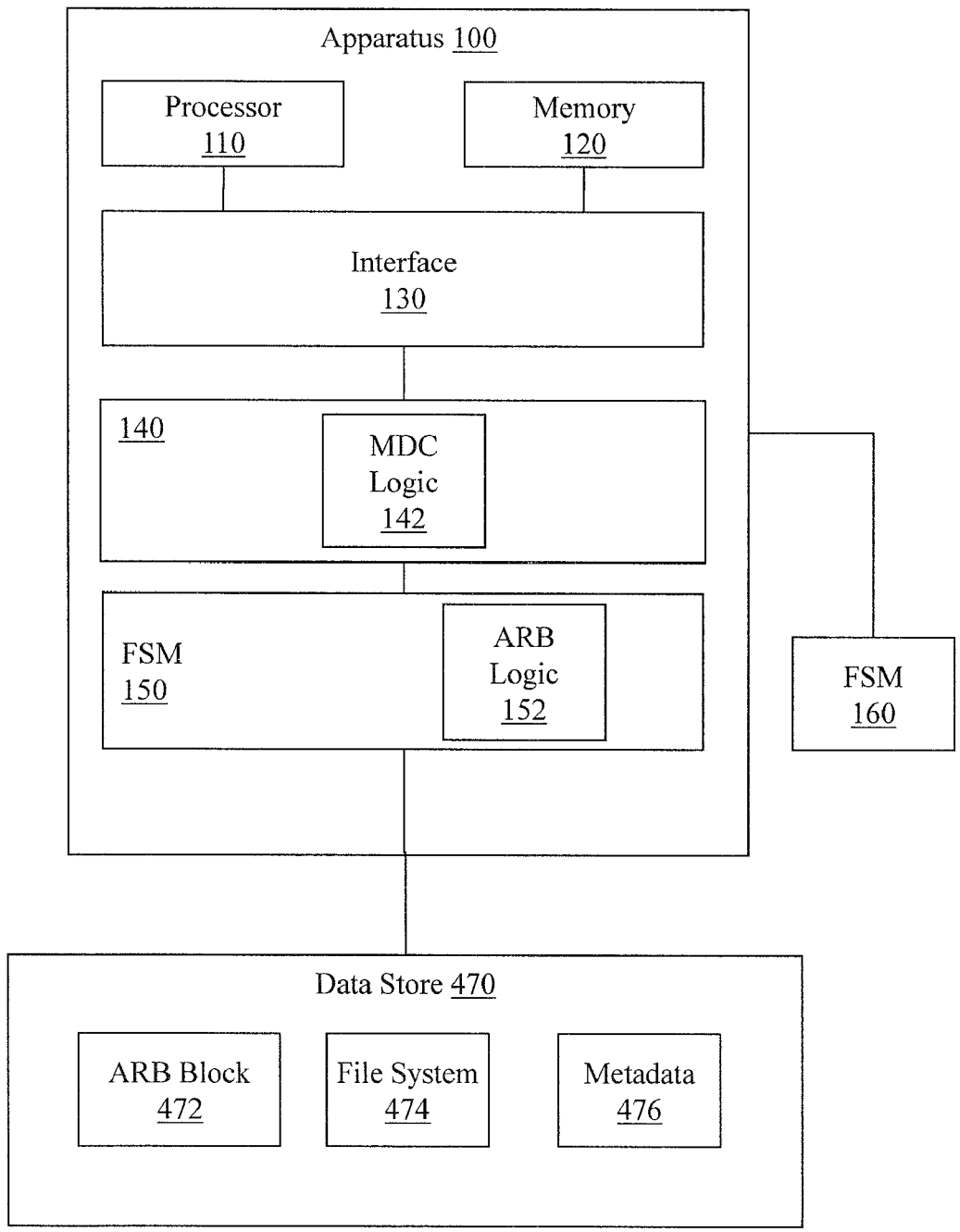
FIG. 4 illustrates an apparatus for maintaining single writer access between a pair of high availability servers.

FIG. 4 illustrates another embodiment of apparatus 100. Apparatus 100 facilitates maintaining single writer access between a pair of high availability servers participating in a timer bounded arbitration protocol for resource control. In this embodiment of apparatus 100, the ARB logic 152 is configured to communicate with a data store 470. The data store 470 stores an ARB block 472, at least a portion of a file system 474 associated with the file system metadata 476, and the file system metadata 476. In this embodiment, the timer bounded arbitration protocol protects the metadata 476 using the ARB block 472 that actually resides on the same data storage device as the metadata 476 that is being protected.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic. The physical manipulations transform electronic components and/or data representing physical entities from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 5:
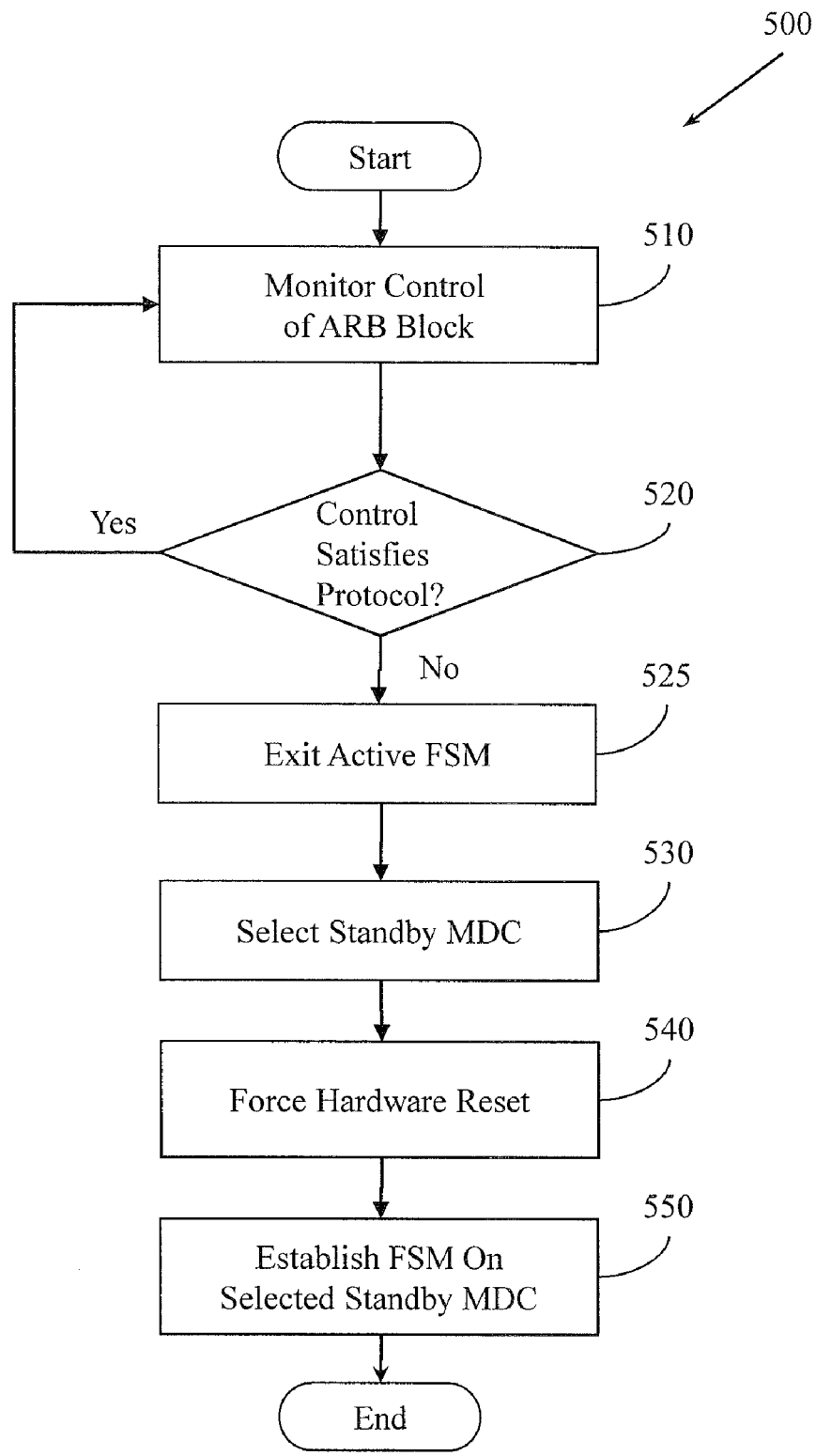
FIG. 5 illustrates a method for maintaining single writer access between a pair of high availability servers.

FIG. 5 illustrates a method 500 that provides a timer bounded arbitration protocol for resource control for maintaining single writer access between a pair of high availability servers. Method 500 includes, at 510, monitoring control of an ARB block by an active FSM. The monitoring at 510 can include monitoring whether the active FSM is reading the ARB block, monitoring whether the active FSM is writing the ARB block, and monitoring whether the active FSM has restarted a bounding timer upon successfully writing the ARB block.

At 520 a determination is made concerning whether the control satisfies the protocol. If the determination is Yes, then processing returns to monitoring at 510. If the determination is No, then processing continues at 530 after the active FSM is exited at 525.

Method 500 includes, at 530, selectively causing a selection of a standby FSM when control of the ARB block does not satisfy a timer bounded ARB protocol. The selection can take the form of an election that identifies a most qualified FSM to take over.

Method 500 also includes, at 540, selectively forcing a hardware reset of an apparatus running the active FSM. In one example, forcing the hardware reset at 540 is performed without a communication with the redundant FSM and without an action by the active FSM.

Method 500 also includes, at 550, selectively establishing an FSM on a selected redundant MDC as a replacement FSM. In one embodiment, selectively establishing the standby FSM as the replacement FSM at 550 includes sending an activation command to the standby FSM, controlling the standby FSM to monitor the ARB block for a safety period of time, and controlling the standby FSM to write the ARB block after determining that the active FSM has not written the ARB during the safety period of time. Thus, rather than blindly activating the standby FSM, a technique is employed where the standby waits and watches the ARB block to make sure that the active FSM really has stopped branding the ARB. As an additional safety measure, the standby FSM can determine that no-one more qualified than the standby FSM has started branding the ARB. Thus selectively establishing the standby FSM as the replacement FSM at 550 can include controlling the FSM to wait to write the ARB block until after determining that the standby FSM state exceeds the state of other FSMs available to write the ARB block.

Figure 8:
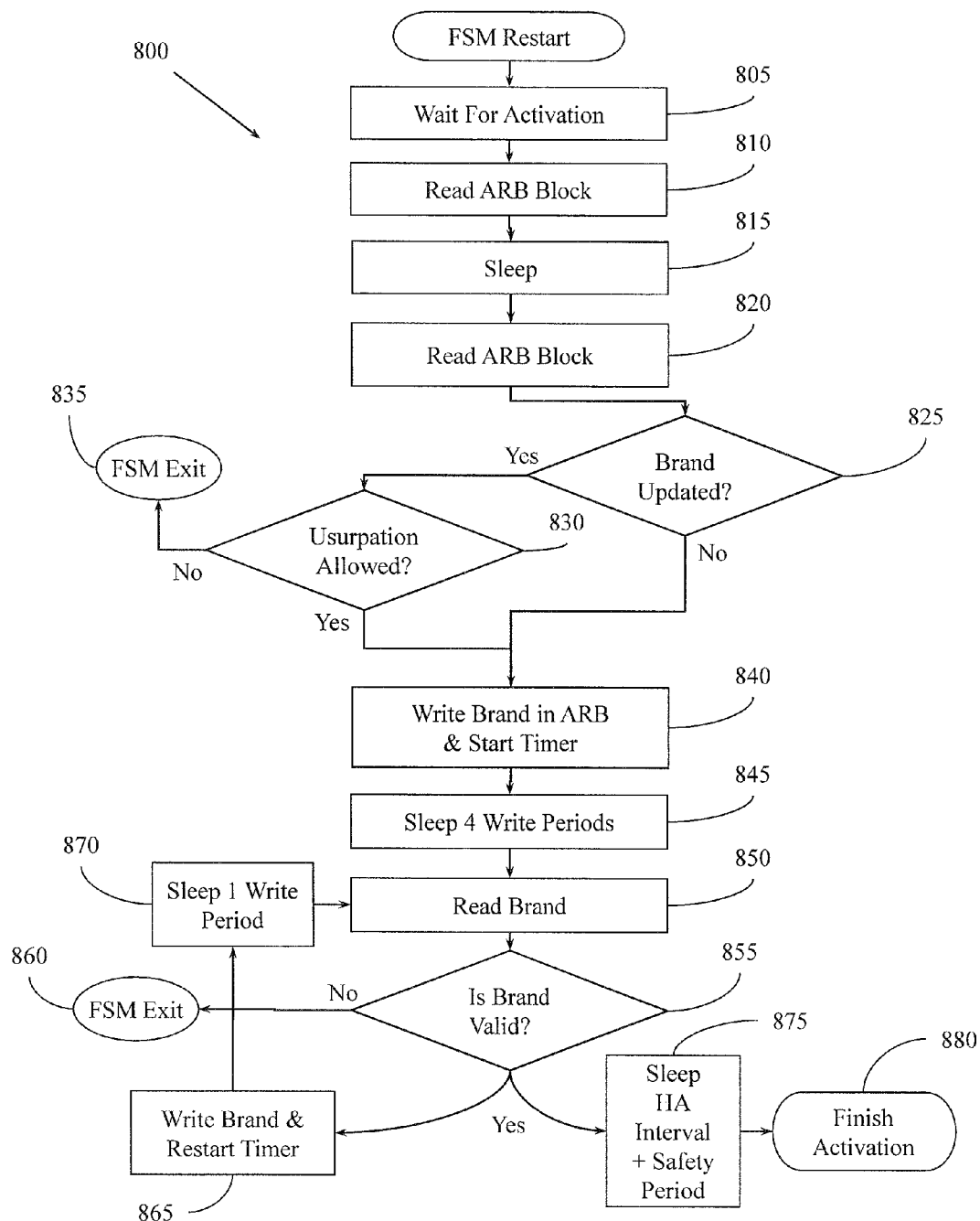
FIG. 8 illustrates additional detail about the logic of an FSM from a (re)start.

By way of illustration, method 800 (FIG. 8) provides more detail about the logic of an FSM from a start or restart to exit. After starting, an FSM reports to its FSMPM that it is waiting for activation. The method 800 therefore waits at 805 for an activation command. After receiving the activation command, the FSM reads the ARB Block at 810, waits one second at 815 to allow another FSM to update the ARB Block if it would, and then reads the ARB Block again at 820. By comparing the blocks read at 810 and 820, the FSM can detect at 825 the activity of another FSM without requiring any other communication or the synchronization of clocks for example. If activity is detected, a further check is made at 830 to determine if the activating FSM has authority to take control by usurpation according to the ARB Protocol in spite of the detected peer FSM. If not, the activating FSM voluntarily terminates at 835, is restarted at 800, and waits in standby status at 805 as described above.

If the activating FSM has authority, then the activating FSM arrives at 840 from either of the tests 825 or 830, writes its own brand, and starts its Reset Timer. At 845, a sleep of four write periods allows another FSM, which might still be active and writing the ARB Block without detecting the usurpation of the ARB Block, to be detected by the activating FSM at 855 following the read of the ARB Block at 850. If the test at 855 detects the brand of another FSM, the activating FSM exits at 860. Otherwise, the activating FSM proceeds simultaneously in multiple threads to 865 and 875. At 875, before writing metadata at 880, the FSM completes a delay period of the HA Interval plus a safety period of two write intervals. The delay period began with the write at 840. If another FSM, which might still be active and writing the ARB Block without detecting the usurpation of the ARB Block, has not rebranded the ARB Block in this delay period, then it is safe to assume that it has either voluntarily exited or its timer has expired and forced the termination of its MDC, thus preventing SBS. The thread at 865 demonstrates the ARB Block rebranding activity of an activated FSM. At 865, the FSM writes its brand in the ARB Block and restarts its timer, waits for one write period at 870, reads the ARB Block Brand at 850, and tests the brand at 855. If the active FSM is delayed in this rebranding loop for more than the HA Interval, its timer will expire and force the MDC to terminate. Branding of the ARB Block, and the testing of ARB Block Brands, is the only communication and synchronization necessary between an activating FSM and any other active or activating FSM.

In one example, a method may be implemented as computer executable instructions. Thus, in one example, a computer readable medium may store computer executable instructions that if executed by a computer (e.g., high availability server) cause the computer to perform the method described above. While executable instructions associated with the above method are described as being stored on a computer readable medium, it is to be appreciated that executable instructions associated with other example methods described herein may also be stored on a computer readable medium.

"Computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an ASIC, a CD (compact disk), other optical medium, a RAM (random access memory), a ROM (read only memory), a memory chip or card, a memory stick, and other media from which a computer, a processor, or other electronic device can read.

Figure 6:
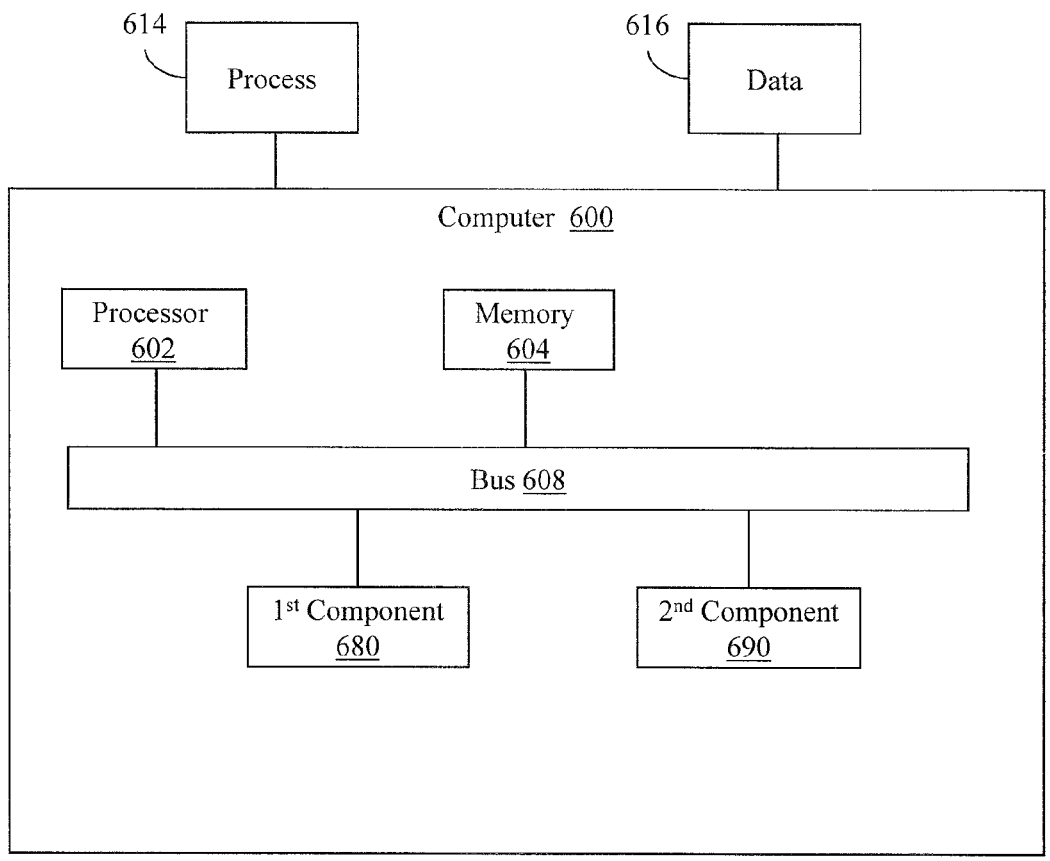
FIG. 6 illustrates a computer that facilitates maintaining single writer access between a pair of high availability servers.

FIG. 6 illustrates a computer 600 that facilitates maintaining single writer access between a pair of high availability servers by participating in a timer bounded arbitration protocol for resource control. Computer 600 includes a processor 602 and a memory 604 that are operably connected by a bus 608. In one example, the computer 600 may include a first component 680 that is configured to prevent a split brain scenario (SBS) in a pair of high availability servers. Component 680 may prevent the SBS by maintaining single writer access to a resource by controlling the resource according to a timer bounded arbitration protocol. The timer bounded arbitration protocol may control self-termination of a writer process. Computer 600 may also include a second component 690 that is configured to control a second writer process to take control of the resource upon determining that no other component is maintaining write access according to the timer bounded arbitration protocol.

Generally describing an example configuration of the computer 600, the processor 602 may be a variety of various processors including dual microprocessor and other multi-processor architectures. A memory 604 may include volatile memory (e.g., RAM (random access memory)) and/or non-volatile memory (e.g., ROM (read only memory)). The memory 604 can store a process 614 and/or a data 616, for example. The process 614 may be an SBS prevention process and the data 616 may be co-ordination and control data.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE (peripheral component interconnect express), 1394, USB (universal serial bus), Ethernet). The bus 608 can be types including, for example, a memory bus, a memory controller, a peripheral bus, an external bus, a crossbar switch, and/or a local bus.

Figure 7:
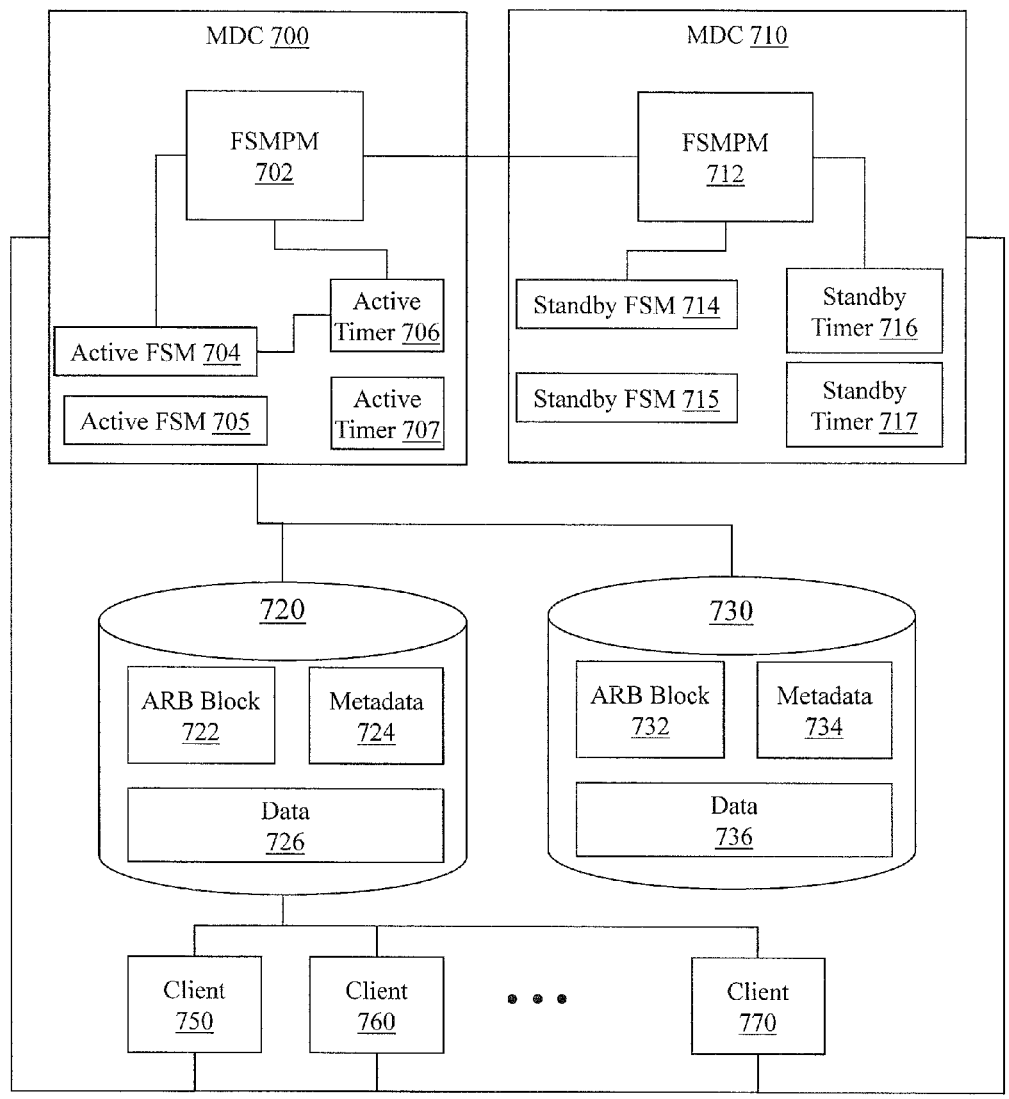
FIG. 7 illustrates an environment in which a pair of high availability servers may operate.

FIG. 7 illustrates an environment in which a pair of high availability servers may operate according to a timer bounded ARB protocol. An MDC 700 includes an FSMPM 702, active FSMs 704 and 705, and active timers 706 and 707. Active FSM 704 has control of ARB block 722 and is tasked with protecting metadata 724 for file system 726. Active FSM 705 has control of ARB block 732 and is tasked with protecting metadata 734 for file system 730. Redundant MDC 710 includes an FSMPM 712, standby FSMs 714 and 715, and standby timers 716 and 717. The MDC 700 and the redundant MDC 710 are arranged on a cluster of co-operating servers providing high availability for data stores 720 and 730. Data store 720 stores an arbitration block 722, a file system 726, and metadata 724 concerning the file system 726. Data store 730 stores an ARB block 732, a file system 736, and metadata 734 concerning file system 736. A set of clients (e.g., client 750, and clients 760 through client 770) are connected to FSM 704, and data store 720, or FSM 705 and data store 730 by a computer network. In one embodiment the set of clients may be connected to data stores 720 and 730 via a storage area network (SAN).

A file system (e.g., file system 720) has a file system manager (e.g., FSM 704). The FSM protects the data 726 and the file system metadata 724 from an SBS where there could be two writers. File system 720 can become corrupted or out of synchronization if file system metadata 724 is being written by more than one writer. Control is exercised by the active FSM 704. MDC 700 and FSM 704 may be the MDC and active FSM for FS 720. At the same time, MDC 710 and FSM 714 may be the MDC and active FSM for FS 730. Additionally, one skilled in the art will appreciate that an MDC may house multiple FSMs.

One of the protections offered by example apparatus and methods is a per process (e.g., per active FSM) timer (e.g., kernel timer) whose expiration resets the MDC, which avoids SBS. Active timer 706 is restarted by the active FSM 704 after the active FSM 704 rebrands the ARB block 722. If the active timer 706 expires, then it is likely that the active FSM 704 is experiencing a failure condition. Therefore, FSMPM 702 may initiate an election whereby the standby FSM 714 is selected to take over control of the ARB block 722 and thus to take over controlling single writer access to the metadata 724. The timer 706 is configured to produce the autonomous action of resetting the MDC 700 without requiring a communication from the redundant MDC 710. Additionally, the timer 706 is configured to produce the autonomous action of resetting the MDC 700 without requiring an action by the active FSM 704. This is an improvement over conventional systems that may have required a communication from a failing process (e.g., active FSM 704) or from the redundant MDC 710. Requiring a communication from either of these entities produced holes in the protection against an SBS.

The MDC 700 and the redundant MDC 710 participate in the timer bounded arbitration protocol. Part of the protocol controls acquisition of an arbitration block by a standby FSM after selection of the standby FSM as the FSM to take over control of the ARB. Once started, an FSM process for a single file system remains in standby mode until one FSM is activated as the result of an election protocol. In one embodiment, the election determines the FSM whose network connections make it most attractive for controlling access to a file system and file system metadata. The criteria that make an FSM attractive include, but are not limited to, a number of available connections, connection bandwidth, connection reliability, and connection redundancy.

After being elected and receiving an activation directive, an FSM relies on the arbitration protocol to determine whether another FSM is active in the metadata. An activated FSM is supposed to brand the ARB block by periodically writing the ARB block. An activating FSM therefore watches the ARB block for a period of time. If no-one else is branding the ARB block, then the activating FSM writes and brands the ARB block and assumes control. The activating FSM may wait for a period of time equal to the dead man timer plus two reset quantums. If someone else is branding the ARB block, then an activating FSM may determine whether the activating FSM is more qualified (e.g., received more votes during an election) than the entity that is branding the ARB block. If the activating FSM is more qualified, then it will start writing the ARB to take control. The less qualified FSM will see the branding by the activating FSM, determine that it is less qualified, and stop branding the ARB block. If the activating FSM is less qualified, then it will not write the ARB block and will stop trying to take control of the ARB block. Before assuming that it has control of the ARB block, the activating FSM will make sure that its brand stays in the ARB block for a safety period of time.

A standby FSM can be selected as part of an election process. In one embodiment, the election process is part of a name server-coordinator system implemented in an FSMPM process. Clients and servers run FSMPM processes as part of a distributed system for monitoring and controlling file system functionality. FSMPMs provide heartbeats to the nameserver-coordinator FSMPM processes. Elections and activations can be based, at least in part, on the presence and absence of heartbeat signals. The FSMPM in an MDC for one or more activated FSMs sends heartbeat signals for its associated FSMs. An election may occur when the heartbeat signals stop.

In one embodiment there is a one to one relationship between an ARB and an active FSM. Additionally, there is a one to one relationship between an active FSM and a file system associated with the file system metadata.

Example apparatus and methods protect metadata and/or databases. In one embodiment, corruption from multiple writers of metadata is prevented by resetting a malfunctioning server computer when an active monitored FSM on the server fails to maintain control of an ARB block within a strict time window. In another embodiment, corruption from multiple writers of a database is prevented by placing database data files on a dedicated file system and resetting the controlling server computer if the file system is still mounted when the active FSM stops.

While example apparatus, methods, and articles of manufacture have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. An apparatus, comprising:
a processor;
a memory; and
an interface to connect the processor, memory, and a set of logics, the set of logics comprising:
a metadata controller (MDC) logic configured to selectively terminate an active File System Manager (FSM) process running on the apparatus and to selectively activate a standby FSM process available on a redundant MDC upon determining that the active FSM process has violated a timer bounded arbitration (ARB) protocol, where the timer bounded ARB protocol relies on an ARB block acting as a resource shared between the active FSM process and the standby FSM process; and
an ARB logic configured to maintain single writer access to file system metadata using the ARB block, and configured to control the active FSM process and the standby FSM process to synchronize control of the ARB block by using the ARB block,
where an MDC housing the active FSM comprises:
an active file system portmapper (FSMPM);
an active file system manager (FSM) connected to the active FSMPM by a socket; and
an active timer,
where the active FSMPM is configured to selectively force an election of an FSM process to replace the active FSM process upon the metadata controller logic determining that the active FSM process has not maintained control according to the timer bounded ARB protocol,
where the active FSM process is configured to maintain ownership of the ARB by periodically writing the ARB according to the timer bounded ARB protocol and to restart the active timer upon successfully writing the ARB,
where an MDC housing the standby FSM comprises:
a standby FSMPM;
a standby FSM process connected to the standby FSMPM by a socket; and
a standby timer,
where the standby FSMPM is configured to activate the standby FSM process after being elected to replace the active FSM process, and
where the standby FSM process is configured to acquire ownership of the ARB, to start the standby timer, to maintain ownership of the ARB by periodically writing the ARB according to the timer bounded ARB protocol, and to restart the standby timer upon successfully writing the ARB.

2. The apparatus of claim 1, the ARB logic being configured to communicate with a data store, where the data store stores the ARB, at least a portion of a file system associated with the file system metadata, and the file system metadata.

3. The apparatus of claim 2, where the active FSM process and the standby FSM process reside on separate pieces of computer hardware, and where the active FSM process and the standby FSM process communicate over a computer network.

4. The apparatus of claim 3, where the apparatus, the data store, and a client computer are connected by a computer network, and where the client computer is configured to write the file system data under control of the active FSM process.

5. The apparatus of claim 1, the timer bounded arbitration protocol comprising:
the active FSM process writing the ARB once per FSM write period to indicate continued ownership of the ARB and, upon successfully writing the ARB, restarting the active timer to a reset threshold period;
the active timer causing a hardware reset of the apparatus upon expiring after an amount of time exceeding the reset threshold period;
the FSMPM of the redundant FSM process selectively activating the standby FSM process upon determining that the standby FSM process has been selected to take control of the ARB; and
upon being activated, the standby FSM process, selectively taking control of the ARB by writing the ARB, and by waiting a delay time period before writing metadata.

6. The apparatus of claim 5, where the FSM write period is 0.5 seconds, where the reset threshold period is 5 seconds, and where the delay time period is the reset threshold period plus twice the FSM write period.

7. The apparatus of claim 1, where the metadata controller logic is configured to control a kernel thread to reset an MDC housing the active FSM.

8. The apparatus of claim 1, where there is a one to one relationship between the ARB and the active FSM process, and where there is a one to one relationship between the active FSM process and a file system associated with the file system metadata.

9. The apparatus of claim 1, where the metadata controller logic is configured to terminate the active FSM process before the standby FSM process writes to the metadata.

10. The apparatus of claim 1, where the active timer is one of, a kernel timer, an operating system timer, and a timer associated with computer hardware operatively connected to the interface, where there is one timer per active FSM process, where the standby timer is one of, a kernel timer, an operating system timer, and a timer associated with computer hardware operatively connected to the interface, and where there is one timer per standby FSM process.

11. The apparatus of claim 1, the metadata controller logic being configured to force a hardware reset of the apparatus in response to the closing of an operating system special file associated with the active timer, where the operating system special file is closed upon the termination of the active FSM process.

12. The apparatus of claim 11, the metadata controller logic being configured to selectively not force the hardware reset of the apparatus in response to the closing of an operating system special file associated with the active timer, upon determining that an operating system unmount of a file system associated with the file system metadata has completed successfully leaving no active data writers on the MDC.

13. A non-transitory computer readable medium storing computer executable instructions that when executed by a computer control the computer to perform a method, the method comprising:
monitoring control of an arbitration (ARB) block by an active file system manager (FSM);
selectively causing a selection of a redundant metadata controller (MDC) when control of the ARB block does not satisfy a timer bounded ARB protocol;
selectively forcing a hardware reset of an apparatus running the active FSM upon expiration of a timer; and
selectively activating an FSM on a redundant MDC as a replacement FSM,
where control of the ARB block by the active FSM comprises:
the active FSM reading the ARB block;
the active FSM writing the ARB block; and
the active FSM restarting a bounding timer upon successfully writing the ARB block.

14. The computer readable medium of claim 13,
where forcing the hardware reset is performed without a communication with the redundant MDC and without an action by the active FSM.

15. The computer readable medium of claim 13, where selectively establishing the FSM on the redundant MDC as the replacement FSM comprises:
sending an activation command to the replacement FSM;
controlling the replacement FSM to monitor the ARB block for a safety period of time; and
controlling the replacement FSM to write the ARB block after determining that the active FSM has not written the ARB during the safety period of time; and
controlling the replacement FSM to start a timer on the replacement FSM after writing the ARB block.

16. The computer readable medium of claim 15, where selectively establishing the FSM on the redundant MDC as the replacement FSM also comprises controlling the FSM on the redundant MDC to write the ARB block after determining that a state on the FSM on the redundant MDC exceeds the state of other FSMs available to write the ARB block, and controlling the FSM on the redundant MDC to start its timer after writing the ARB block.

* * * * *